US012785160B2

(12) United States Patent
Trzaska

(10) Patent No.: US 12,785,160 B2
(45) Date of Patent: Nov. 3, 2026

(54) PROPAGATION TEST CELL FOR SECONDARY ELECTRICAL BATTERY CELLS AND CELL MODULES

(71) Applicant: IAV GmbH Ingenieurgesellschaft Auto und Verkehr, Berlin (DE)

(72) Inventor: Frank Trzaska, Rotenburg (DE)

(73) Assignee: IAV GmbH Ingenieurgesellschaft Auto und Verkehr, Berlin (DE)

( * ) Notice: Subject to any disclaimer, the term of this patent is extended or adjusted under 35 U.S.C. 154(b) by 566 days.

(21) Appl. No.: 18/277,993

(22) PCT Filed: Feb. 21, 2022

(86) PCT No.: PCT/DE2022/100136
§ 371 (c)(1),
(2) Date: Aug. 20, 2023

(87) PCT Pub. No.: WO2022/174870
PCT Pub. Date: Aug. 25, 2022

(65) Prior Publication Data

US 2024/0055676 A1 Feb. 15, 2024

(30) Foreign Application Priority Data

Feb. 22, 2021 (DE) ..................... 10 2021 104 098.1

(51) Int. Cl.
*H01M 10/42* (2006.01)
*H01M 10/48* (2006.01)
*H01M 50/569* (2021.01)

(52) U.S. Cl.
CPC ..... *H01M 10/4285* (2013.01); *H01M 10/486* (2013.01); *H01M 50/569* (2021.01); *H01M 10/42* (2013.01); *H01M 10/48* (2013.01)

(58) Field of Classification Search
CPC .. H01M 10/42; H01M 10/4285; H01M 10/48; H01M 10/486; H01M 50/569
(Continued)

(56) References Cited

U.S. PATENT DOCUMENTS 3,818,325 A 6/1974 Boshers
10,718,816 B2 7/2020 Ishihara et al.
(Continued)

FOREIGN PATENT DOCUMENTS

CN 201096874 8/2008
CN 201945527 U 8/2011
(Continued)

*Primary Examiner* — Brian K Talbot
(74) *Attorney, Agent, or Firm* — Smartpat PLC

(57) ABSTRACT

A propagation test cell includes a first substantially cuboid housing part and a drive mechanism arranged therein. The drive mechanism moves a nail along a movement axis. A second housing part has a reference surface parallel and directed opposite to a reference surface of the first housing part and is in contact therewith. The second housing part has a passage coaxial with the movement axis of the nail. The passage has a passage cross-sectional area greater than the diameter of the shank of the nail. Dimensions of the outer form of the propagation test cell correspond to a multiple of the respective dimensions of a battery cell with which the propagation test cell can be arranged within a cell module, so that the propagation test cell can be substituted with at least one additional battery cell or with a multiple thereof within a cell module.

6 Claims, 6 Drawing Sheets

(58) Field of Classification Search
USPC ........................................................ 429/90, 58
See application file for complete search history.

(56) References Cited

U.S. PATENT DOCUMENTS

| | | | | |
|---|---|---|---|---|
| 10,725,119 | B2 | 7/2020 | Miyazawa et al. | |
| 11,411,421 | B2* | 8/2022 | Komiyama | H02J 7/933 |
| 2005/0073314 | A1 | 4/2005 | Bertness et al. | |
| 2005/0253591 | A1* | 11/2005 | Kasamatsu | H01M 10/4285 324/432 |
| 2013/0127473 | A1* | 5/2013 | Ikeda | H01M 10/0431 324/426 |
| 2013/0252070 | A1* | 9/2013 | Reitzle | H01M 10/4285 429/178 |
| 2015/0072197 | A1* | 3/2015 | Sawanishi | H01M 50/553 429/90 |
| 2017/0301968 | A1* | 10/2017 | Cooney | H01M 50/457 |
| 2018/0123166 | A1* | 5/2018 | Fakhri | H01M 50/342 |
| 2019/0162771 | A1* | 5/2019 | Miyazawa | G01R 31/3865 |
| 2019/0195959 | A1* | 6/2019 | Ishihara | H01M 10/4285 |
| 2020/0036068 | A1* | 1/2020 | Recoskie | H01M 10/4285 |
| 2021/0210798 | A1 | 7/2021 | Vincent et al. | |
| 2022/0102768 | A1* | 3/2022 | Okuyama | G01R 1/06711 |
| 2022/0163593 | A1* | 5/2022 | Kagei | H01M 10/4285 |
| 2022/0365038 | A1* | 11/2022 | Ma | G01N 29/265 |

FOREIGN PATENT DOCUMENTS

| | | | | |
|---|---|---|---|---|
| CN | 103837712 | A | 6/2014 | |
| CN | 105068013 | A | 11/2015 | |
| CN | 106272165 | A | 1/2017 | |
| CN | 107421682 | A * | 12/2017 | G01L 19/00 |
| CN | 108134126 | A | 6/2018 | |
| CN | 209841915 | U | 12/2019 | |
| DE | 60100075 | | 2/2003 | |
| DE | 102016216075 | A1 | 3/2017 | |
| DE | 102020126305 | A1 | 4/2022 | |
| EP | 2157653 | B1 | 5/2014 | |
| EP | 2833431 | A4 | 12/2015 | |
| JP | 3729553 | B2 | 12/2005 | |
| JP | 2016012414 | A | 1/2016 | |
| JP | 6631792 | B2 | 1/2020 | |
| JP | 2020191181 | A | 11/2020 | |
| KR | 20150054371 | A | 5/2015 | |
| WO | 2012117660 | A1 | 9/2012 | |
| WO | 2023085768 | A1 | 5/2023 | |

* cited by examiner

PROPAGATION TEST CELL FOR SECONDARY ELECTRICAL BATTERY CELLS AND CELL MODULES

CROSS-REFERENCE TO RELATED APPLICATION

This application is a national stage application, filed under 35 U.S.C. § 371, of International Patent Application PCT/DE2022/100136, filed on Feb. 21, 2022, which claims the benefit of German Patent Application DE 10 2021 104 098.1 filed on Feb. 22, 2021.

TECHNICAL FIELD

The disclosure relates to the technical field of testing the functionality of secondary battery cells, and in particular to conducting a propagation test.

BACKGROUND

The propagation of secondary electric battery cells describes the effect of thermal runaway, wherein an electrical short circuit occurs due to impurities on the separator or external mechanical degradation inside a battery cell. The short-circuit current that builds up as a result can cause the damaged area to heat up, wherein surrounding regions and other battery cells may be damaged and further short circuits may arise. Such damage can spread across a cell module, wherein the energy stored in the entire accumulator is released in a short time. Accordingly, a propagation test is known as a method for testing secondary electrical battery cells and cell modules with respect to mechanical degradation, such as the partial or complete penetration of foreign bodies, dendrite formation or even cell aging, which can lead to an internal electrical short circuit of at least one battery cell.

The propagation test is standardized, for example, in DIN EN 62619 or in GB 38031-2020 as a propagation test, wherein a nail, which is insulated from the rest of the test structure and is preferably made of conductive and unalloyed steel, partially penetrates or completely penetrates a battery cell or cell module. Alternatively, the nail can comprise a ceramic housing part or shell, wherein only the tip of the nail is made of steel or an electrically conductive material, so that the nail is insulated from the cell wall when it enters a battery cell. The geometric dimensions of the nail, the penetration depth and the penetration speed are parameters that are defined in the respective test standard. Generally, the nail comprises at least one shank designed as a pin, which is particularly designed in its stability in order to withstand the mechanical stress of penetrating into or penetrating through at least one other battery cell. A propagation test is considered to have been passed if no further battery cells of a cell module thermally run away in the event of an electrical short circuit. Other results may include deformation or mechanical stress, temperature variation as a function of time along with electrical voltage before and after testing the battery cell or cell module, among other parameters.

Devices that should enable a reproducible course of the propagation test are known from the state of the art. For example, patent application publication CN106272165A discloses a rectangular battery pin detection clamp, by means of which substantially rectangular battery cells can be clamped and wherein the propagation test is assisted by a steel pin guide mechanism. Utility model CN201096874Y discloses a nail puncture tester, wherein battery cells are mechanically clamped into an external device as the test object and a nail is guided to the test object by a hydraulically actuated guide device. Patent publication CN105068013B discloses a corresponding device with pneumatic actuation of the nail.

Patent publication U.S. Ser. No. 10/718,816B2 discloses a device wherein a conductive nail is provided with an electrically insulated sheath, wherein the sheath and nail enter a battery cell together and the nail is only forced out of the sheath inside the battery cell, such that it creates a short circuit between an anode and a cathode. In this case, the electrically conductive nail is coupled to measuring devices, such that the voltage resulting across the nail and the short circuit can be measured.

From the aspect of the safety consideration of secondary electrical battery cells with regard to thermal runaway, on the one hand, the most realistic possible generation of an internal short circuit and, on the other hand, a measurement of the result parameters of the propagation test directly at the point of damage is useful. However, the devices and methods known in the prior art all have in common that a nail or physical element is inserted into a battery cell or cell module from the outside, which has various disadvantages. For example, temperature and chemical degradation cannot spread equally in all spatial directions from the point of damage, sealing of the external puncture point is required and it is not possible to record measured values such as temperature, deformation or mechanical stress directly at the stressed point. If thermal runaway is to be triggered by heating, thermal energy input from the adjacent battery cells is also unavoidable, leading to thermal runaway of more than one battery cell along with erroneous measurement results.

SUMMARY

The present disclosure is based on the object of providing a propagation test cell that is arranged inside a cell module in place of one or more battery cells and via which a propagation test can be initialized from the inside. This object is achieved by a propagation test cell as disclosed herein along with a method as disclosed herein. The propagation test cell comprises a mechanism for inserting a nail into an adjacent battery cell along with integrated temperature and pressure measuring points. This allows testing a cell module, wherein the propagation test can be initialized without external damage to the cell module. This provides the following advantages:

- no external mechanical stress on the cell module;
- no external sealing of a puncture site or the cell module necessary;
- initialization of the short circuit inside the battery cell or cell module;
- propagation of thermal runaway in all spatial directions of the cell module can be mapped realistically;
- recording with measurement technology of the temperature curve and mechanical pressure directly at the point of damage, by means of integrated temperature and pressure measuring points; and
- thermal and mechanical behavior of the original battery cells can be mapped inside the propagation test cell.

The following detailed description of the invention is supported by the illustration of the following figures.

DETAILED DESCRIPTION

Figure 1A:
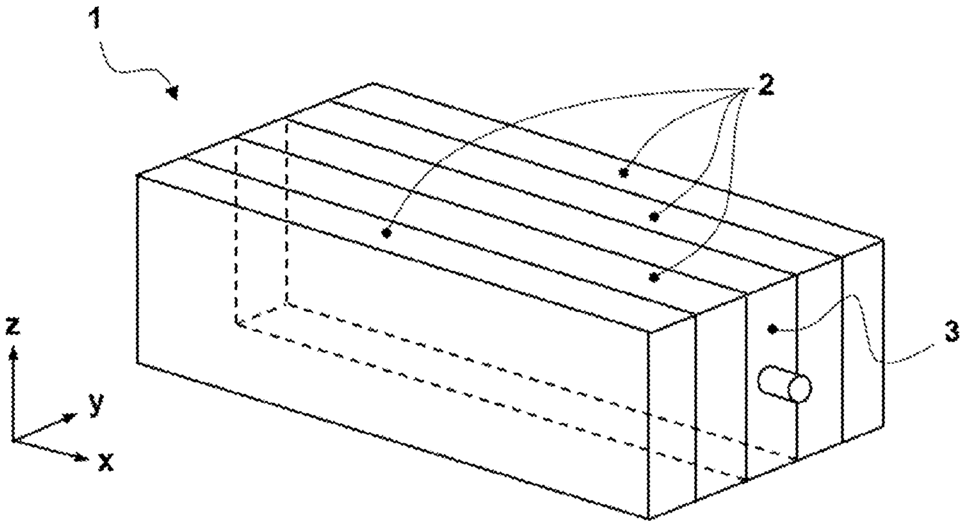
FIG. 1A shows a propagation test cell replacing a single battery cell.
Figure 1B:
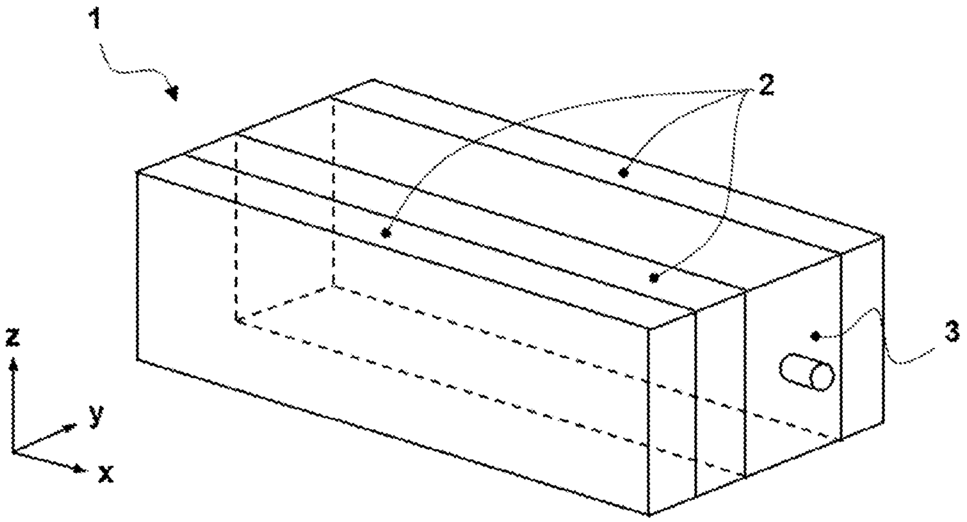
FIG. 1B shows a propagation test cell replacing two battery cells in a cell module.

In accordance with FIG. 1A and FIG. 1B, a cell module 1 comprises a plurality of battery cells 2, which can be arranged in a stacked manner in a known manner and electrically interconnected to form a battery pack. In an advantageous manner, at least one individual one of the battery cells 2 inside the cell module 1 can now be substituted by a propagation test cell 3, so that, like a dummy cell, it has, on the one hand, technical properties on the basis of which the propagation test cell 3 does not impair or only slightly impairs the corresponding physical properties of the entire cell module 1 in comparison with a cell module 1 without a propagation test cell 3 and, on the other hand, comprises a mechanism for initializing a propagation test. To fulfill these technical effects, the propagation test cell 3 has features that are explained in detail below.

Figure 2A:
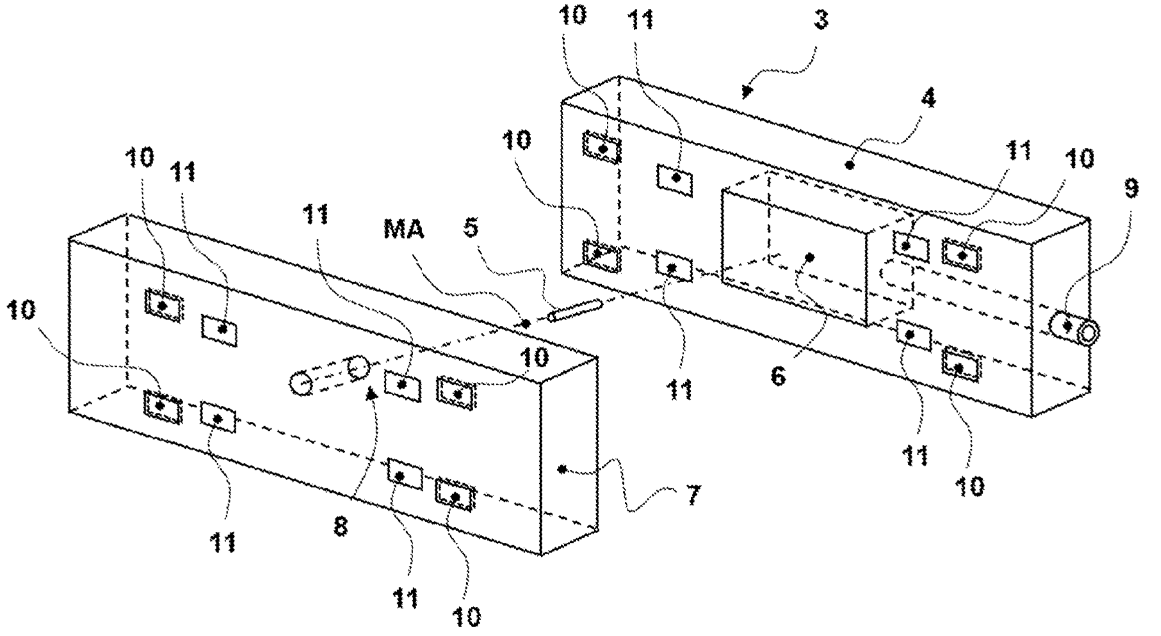
FIG. 2A shows the basic structure of a propagation test cell in exploded view.

In accordance with FIG. 2A, the propagation test cell 3 comprises a first housing part 4, which has a substantially cuboid outer form. The substantially cuboid outer form refers to the preferred application purpose of the propagation test cell 3 inside a cell module 1, in which individual battery cells 2 have a substantially cuboid basic form comprising, for example, a substantially square or rectangular base area. However, the exact geometric design of the geometric form or the base area of the battery cells 2 used plays a subordinate role, since the external form of the propagation test cell 3 is to correspond to that of the other battery cells 2 used in the application. For the initialization of the propagation test, the shape of the further battery cells 2 and thus of the first housing part 4 is only of importance to the extent that a nail 5, actuated by a drive mechanism 6, penetrates from the propagation test cell 3 into an adjacent battery cell 2, wherein the said adjacent battery cell 2 is in contact with an outer surface of the propagation test cell 3 with at least one surface of its outer form or that the corresponding surfaces are arranged opposite one another at least at a small distance.

Figure 2B:
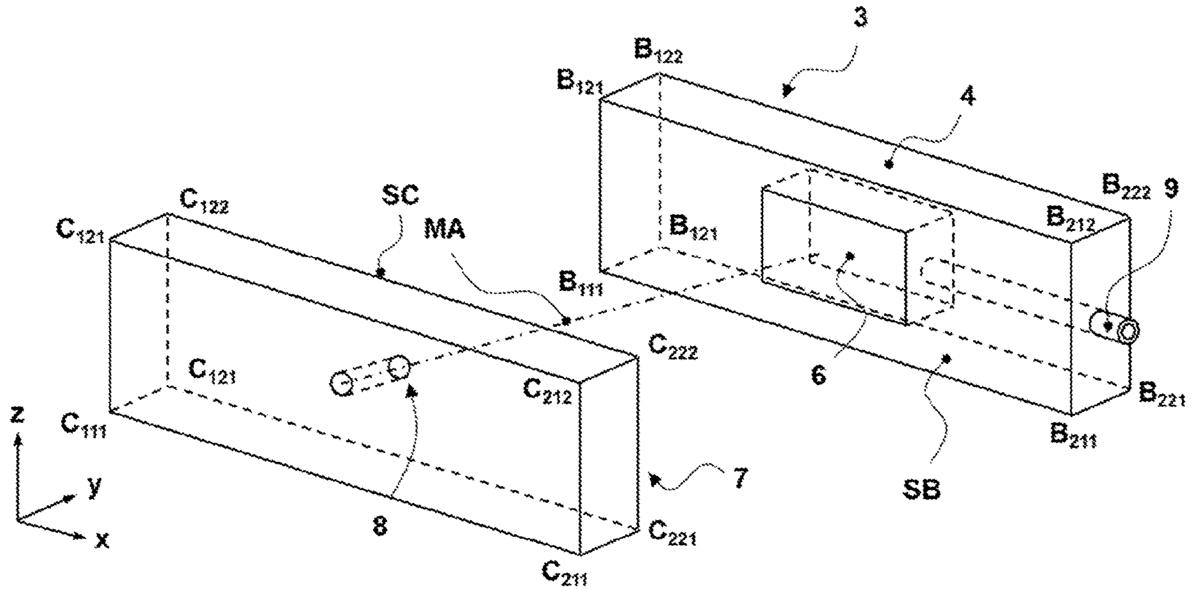
FIG. 2B shows the reference geometry of the outer shape of the propagation test cell.

In accordance with FIG. 2B, the spatial configuration of the propagation test cell 3 can be represented in a Cartesian coordinate system (x, y, z), wherein it is specified for the further course of the description that the base area of the first housing part 4 comprises a substantially square or rectangular shape, which is spanned between the corner points $B_{111}$, $B_{211}$, $B_{212}$, $B_{121}$ and thus forms the reference side SB of the first housing part 4. The propagation test cell 3 further comprises a second housing part 7, which preferably also has a substantially square or rectangular base area, which in particular preferably corresponds to the base area of the first housing part 4. For the purpose of supporting the following description, the reference surface SC of the second housing part 7 is defined as that base area which is spanned between the corner points $C_{121}$, $C_{221}$, $C_{222}$, $C_{122}$. However, the base area of the second housing part 7 can have any other shape, provided that it does not exceed the dimensions of the base area of the first housing part 4, such that the external form of the entire propagation test cell 3 continues to correspond to that of one or more battery cells 2, or it can be substituted throughout for one or more battery cells 2.

The nail 5, which is to generate the internal short circuit in an adjacent battery cell 2 within the framework of a propagation test, comprises an electrically conductive material and is preferably made of an unalloyed steel. The specific dimensions of the nail 5 are generally determined by the relevant test standards or regulations for carrying out the propagation test, and are additionally based on the external form of the battery cells 2 of the applied cell module 1. In accordance with applicable standards, in a preferred embodiment, the nail 5 comprises a diameter of the shank of from 1 mm to 20 mm, more preferably from 3 mm to 8 mm, and a conical angle of the end of the shank of preferably from 20° to 60°. Alternatively, any other geometric dimension of the nail 5 can be applied to the extent that it is designed to penetrate through at least one each of an anode and a cathode of a battery cell 2 adjacent to the propagation test cell 3 or to establish an internal short circuit in a said battery cell 2.

The first housing part 4 of the propagation test cell 3 comprises at least one drive mechanism 6, which is arranged entirely or partly in the interior of that first housing part 4 and is configured to move the nail 5 along a movement axis MA, which corresponds to an orthogonal to the reference surface of the first housing part SB, wherein the movement of the nail 5 preferably is in the direction of the second housing part 7. Accordingly, the drive mechanism 6 is an independent device inside the propagation test cell 3, which fulfills the technical object of pushing the nail 5 into the at least one adjacent battery cell 2, such that at least one anode and one cathode each are electrically bridged, but preferably at least 10-90% of the cell thickness is penetrated. Accordingly, the drive mechanism 6 comprises a completely or partly self-contained system with mechanical, hydraulic, pneumatic, electrical or magnetic components. The corresponding mechanism is integrated into the first housing part 4 of the propagation test cell 3. To accomplish this, in one embodiment the drive mechanism 6 can be completely integrated into the first housing part 4, preferably via a corresponding recess or cavity in the material of the first housing part 4, corresponding for example to the illustration in FIG. 2A, wherein the recess is schematically indicated as a cuboid structure inside the first housing part 4, which comprises a physical connection to the end face of the first housing part 4. The end face is given in FIG. 2B for example by the area spanned by the corner points $B_{211}$, $B_{221}$, $B_{222}$, $B_{212}$.

In one embodiment, the propagation test cell 3 comprises at least one test interface 9, which is arranged on at least one end face of the first housing part 4 and establishes a physical connection to the drive mechanism 6 and/or to functional elements such as temperature measuring points 10 and the pressure measuring points 11, such that the drive mechanism 6 can be activated via that test interface 9 and/or electrical line connections to the temperature measuring points 10 and the pressure measuring points 11 can be lead away to the outside. Thereby, the test interface 9 substantially fulfills two functions here. On the one hand, it enables the actuation of the drive mechanism 6 and, on the other hand, further mechanical or electrical interfaces of functional elements, such as, for example, the said temperature measuring points 10 and/or pressure measuring points 11 to the test environment can be established via this. The actuation of the drive mechanism 6 can be mechanical, hydraulic, pneumatic, electric or magnetic, by which the test interface 9 can be designed accordingly. In one embodiment in which the drive mechanism 6 is mechanically actuated, the test interface 9 can comprise only a mechanical recess or through hole, which is designed, for example, to act as a mechanical guide for mechanical components, such as levers, linkages, transmission mechanisms or others. In an alternative embodiment in which the drive mechanism 6 is hydraulically or pneumatically actuated, the test interface 9 can comprise pneumatic or hydraulic piping, for example, in order to supply the corresponding pneumatic or hydraulic fluids to the drive mechanism 6. In an alternative embodiment in which the drive mechanism 6 is actuated electrically or magnetically, the test interface 9 can be designed, for example, as a line guide or directly in the form of electrical lines. Alternatively, the test interface 9 can comprise any further configuration in order to provide a functional interface between the test environment and the drive mechanism 6. In addition, the test interface 9 can comprise further connections of the type mentioned, which establish interfaces between the test environment and the further functional elements such as temperature measuring points 10 and/or pressure measuring points 11.

The nail 5 is technically coupled to the drive mechanism 6. The technical coupling between nail 5 and drive mechanism 6 is preferably a mechanical connection. In one embodiment, the nail 5 is mechanically coupled to at least one component of the drive mechanism 6. In an alternative embodiment, the nail 5 is mechanically coupled to at least one adapter component, which is mechanically connected to at least one component of the drive mechanism 6. Generally, the mechanical coupling between the nail 5 and the drive mechanism 6 is designed to fix the nail 5 completely or partly within the first housing part 4 prior to actuation of the drive mechanism 6, and to move the nail 5 along its movement axis MA by the performed work of the actuated drive mechanism 6. The axis of movement MA corresponds to an orthogonal to the reference surface SB of the first housing part 4, by which the nail 5 is moved in the said orthogonal direction away from the reference surface SB and in the direction of the corresponding surface of the at least one adjacent battery cell 2, such that the angle of entry of the nail into the adjacent battery cell 2 is advantageously perpendicular, such that, from the kinetic energy of the nail 5, the greatest possible pressure is exerted on the adjacent battery cell 2 and at the same time its path of movement after penetration into the said battery cell 2 is stabilized.

In one embodiment, the drive mechanism 6, which is arranged within a recess of the first housing part 4, comprises an opening to the surface of the first housing part 4, preferably at its reference surface SB, the dimensions in terms of surface of which are at least greater than those of the cross-sectional area of the nail 5, so that the said nail 5, due to the actuation of the drive mechanism 6 and in its movement along the movement axis MA, can pass the said opening unhindered. In one embodiment in which the drive mechanism 6 comprises a mechanical actuation, the opening to the reference surface SB of the first housing part 4 can comprise dimensions that are designed to move mechanical components of the drive mechanism 6 completely or partly out of the corresponding recess within the first housing part 4, so that the nail 5 is movably arranged along the movement axis MA. In an embodiment in which the drive mechanism 6 is arranged to be hydraulically or pneumatically activatable, the opening to the reference surface SB of the first housing part 4 can comprise dimensions that are designed to seal the recess of the drive mechanism 6 with respect to the environment against leakage of the hydraulic or pneumatic fluid, for example via a corresponding fit and additional sealing elements, for sealing the cell wall of the adjacent battery cell 2 against leakage of reaction gases developing as a result of thermal runaway. Alternatively, the opening can comprise guide elements that are designed to support and/or guide the nail 5 in its movement along the movement axis MA, for example via a corresponding fit.

Alternatively, and advantageously with respect to ensuring unimpaired movement of the nail 5 along the movement axis MA, the second housing part 7 comprises a passage, in the form of a through hole 8, which is designed to allow movement of the nail 5 out of the interior of the drive mechanism 6 and thus of the first housing part 4 into at least one adjacent battery cell 2. Accordingly, the diameter of the through hole 8 is at least greater than the diameter of the shank or the part of the nail 5 that passes the second housing part 7. In an advantageous embodiment, the through hole 8 comprises a corresponding fit, such that the nail 5 or the part thereof passing through the through hole 8 is guided in its movement. In an alternative advantageous embodiment, the second housing part 7 comprises further elements, which have a the said fit and additionally support the guidance of the nail 5 in its movement along the movement axis MA. Alternatively, any other configuration of the through hole 8 is applicable, to the extent that the nail 5 can pass through it unhindered in its movement along the axis of movement MA. Accordingly, the nail 5 comprises at least a length of the sum of the width of the second housing part 7, which comprises the spread in the y-direction in accordance with FIG. 2B, along with a required minimum penetration depth into the adjacent battery cell 2. The required minimum penetration depth results from the applied test parameters and can accordingly range from preferably 10-90% of the cell thickness of the adjacent battery cell 2 to a plurality of the said cell thickness. Similarly, the drive mechanism 6 comprises dimensions and components that are designed to move the nail 5 in a stroke at least equal to the required penetration depth.

Advantageously, the propagation test cell 3 not only fulfills the purpose of executing the drive mechanism 6 and thus initializing a thermal penetration by dendrite formation in at least one adjacent battery cell 2 of a cell module 1, but additionally comprises physical properties by which the consequences of the propagation of the thermal penetration in the said adjacent battery cell 2 to further surrounding battery cells 2 can be simulated. For these purposes, the first housing part 4 and the second housing part 7 may comprise materials, the combination of which allows the propagation test cell 3 as a whole to mimic the thermal and electrical conductivity of the further battery cells 2. Thereby, the physical target properties may be, in particular, thermal conductivity, heat capacity, electrical conductivity and modulus of elasticity, along with other physical properties. In general, first housing part 4 and second housing part 7 may preferably comprise metals and metal compounds, plastics and special polymers along with fiber composites as materials. In an advantageous embodiment, first housing part 4 and second housing part 7 preferably comprise materials that can be produced by extruding manufacturing processes such as 3D printing or rapid prototyping. In this manner, the propagation test cell 3 can be manufactured in a mobile manner and can be adapted at short notice to deviating geometric and/or physical requirements. In an advantageous embodiment, the first housing part 4 and/or the second housing part 7 can be producible by means of metal 3D printing, in particular aluminum printing. In general, the first housing part 4 and the second housing part 7 may comprise material pairings that mimic the aforementioned physical properties of the entire propagation test cell 3 in a manner appropriate to the requirements. In an advantageous embodiment, the second housing part 7 comprises materials that have electrically insulating properties in order to electrically insulate the first housing part 4 of the propagation test cell 3 and in particular the nail 5 of the drive mechanism 6 with respect to the at least one adjacent battery cell 2. This can be done, for example, by an additional foil coating of at least the base areas of the two housing parts (4, 7) opposite the reference surfaces (SB, SC). Additionally, a pairing consisting of a first housing component 4 and a second housing component 7 can comprise a mechanical and/or chemical or any other connection, in order to couple both the said components together. In one embodiment, the extent in terms of surface of the reference surface SC of the second housing part 7 is at least greater than that extent in terms of surface of the opening to the reference surface SB of the first housing part 4, such that that opening is completely closable by the second housing part 7 in contact with the reference surface SB of the first housing part 4, with the exception of the through hole 8. Wherein the through hole 8 can also initially be completely or partly open or closed prior to actuation of the drive mechanism 6, wherein the completely or partly closed state preferably can be produced by the foil coating or further sealing elements, for sealing against reaction gases. Alternatively, the through hole 8 can be closed by other elements prior to actuation of the drive mechanism 6, such that it is opened by actuation of the drive mechanism 6 and/or by piercing the nail through the corresponding closure.

In one embodiment, the dimensions of the external form of the propagation test cell 3 comprise, in all spatial directions, a multiple of the corresponding respective dimensions of the battery cell 2, with which the said propagation test cell 3 can be arranged within a cell module 1. In an advantageous embodiment, at least one dimension of the outer form of the propagation test cell 3, preferably the width extent, comprises a multiple of the corresponding dimension of the battery cell 2, with which the propagation test cell 3 can be arranged within a cell module 1, wherein the remaining dimensions of the propagation test cell 3 resemble those of the battery cell 2, so that the propagation test cell 3 is substitutable with at least one further battery cell 2 or a multiple thereof within a cell module 1. In a preferred embodiment, the said multiples of the spatial dimensions correspond to integer multiples, so that the propagation test cell 3 can replace integer multiples of the battery cells 2. The width dimension of the propagation test cell 3 corresponds in accordance with FIG. 2B to the y-direction of the indicated Cartesian coordinate system (x, y, z). The drive mechanism 6 of the propagation test cell 3 is designed in order to insert the nail 5 into at least one adjacent battery cell 2 of a cell module 1. Depending on the geometrical configuration of the battery cells 2 or the entire cell module 1 or the requirements of the propagation test to be performed, such as partial or complete penetration, or in other words the ratio of the necessary penetration depth of the nail 5 to the width expansion of the further battery cells 2, it can be necessary for the nail 5 to have a minimum length expansion that is greater than the single width expansion of one of the further battery cells 2. For this special case, the first housing part 4 can comprise an increased width extent, so that the entire propagation test cell 3 comprises a multiple of an adjacent battery cell 2. In this advantageous manner, a plurality of battery cells 2 can be substituted by the propagation test cell 3. According to this feature, the longitudinal extent of the nail 5 can advantageously comprise any dimension, relative to the rest of the test assembly.

In an advantageous embodiment, the propagation test cell 3 comprises at least one temperature measuring point 10 and/or at least one pressure measuring point 11. By using temperature measuring points 10 and pressure measuring points 11, it is possible to determine the temperature curve along with the mechanical stress on the propagation test cell 3 and thus the change in load in the entire cell module 1 during the propagation test and in the immediate vicinity of the point of damage caused by the short circuit. In an advantageous embodiment, in which a plurality of temperature measuring points 10 and/or pressure measuring points 11 are arranged within the propagation test cell 3, the temperature curve along with the mechanical stress during the propagation test can be measured at a plurality of positions within the propagation test cell 3, by which the physical effects of the propagation of the at least one adjacent battery cell 2 and the entire cell module can be mapped more accurately. In one embodiment, the temperature measuring points 10 and pressure measuring points 11 are arranged on the surfaces, in particular on the reference surfaces (SB, SC) of the first and second housing parts (4, 7). In an embodiment in which the second housing part 7 has electrically insulating properties with respect to the at least one adjacent battery cell 2, the temperature measuring points 10 and pressure measuring points 11 are in this manner also electrically insulated from the latter and at the same time arranged in the immediate vicinity of the surface of the adjacent battery cell 2. In an alternative advantageous embodiment, the temperature measuring points 10 and pressure measuring points 11 are arranged inside the first housing part 4 and/or the second housing part 7. For this purpose, for example, further recesses can be provided in the material of the two housing parts (4, 7) during production. Such recesses may further comprise a physical connection to the surfaces, such that the corresponding temperature measuring points 10 and pressure measuring points 11 can be arranged at the respective positions. For this purpose, the second housing part 7 can additionally comprise corresponding protrusions on the reference surface SC, which project completely or partly into the associated recesses of the temperature measuring points 10 and pressure measuring points 11 of the first housing part 4, so that the said measuring points are fixed and protected/insulated.

Furthermore, the disclosure comprises a method for performing a propagation test on a cell module 1 comprising at least two battery cells 2, comprising the substitution of at least one of the battery cells 2 with a propagation test cell 3 in a first step S1. In one embodiment, in which a propagation test according to the application is initialized by bridging at least one cathode and one anode of a battery cell 2, a corresponding nail 5 must penetrate the corresponding battery cell 2 to a required depth, such that a single propagation test cell 3 has the same dimensions as one of the other battery cells 2, with sufficient space for a drive mechanism 6 in the first housing part 4. Accordingly, it is sufficient if exactly one battery cell 2 is replaced by the propagation test cell 3. In one embodiment, in which the complete penetration through of a battery cell 2 is required for carrying out a propagation test according to the application, the propagation test cell 3 can comprise an integer multiple, but at least twice, the width extent of the battery cell 2, so that the first housing part 4 has sufficient space to be able to arrange a drive mechanism 6, which is designed to fix a correspondingly required long nail 5.

In a second step S2, the physical and electrical integration of the propagation test cell 3 inside the cell module 1 takes place, wherein this is positioned and fixed in the same manner as the further battery cells 2 inside the cell module 1, wherein the propagation test cell 3 can be electrically connected in the same manner as the further battery cells 2 inside the cell module 1 or bridged accordingly, such that the current circuit of the accumulator is not interrupted. In a further step S3, the temperature measuring points 10 and pressure measuring points 11 are networked with the further test setup, wherein the electrical cabling of the said measuring points, which are fed from one or more test interfaces 9, can be connected to measuring equipment. In a further step S4, the preparation of the cell module 1 takes place, wherein the accumulator is electrically charged and/or tested for its functional capability within the test setup. In a further step S5, the recording with measurement technology of the measurement parameters such as electrical voltage, temperature, pressure over time and further parameters, which result from test parameters according to the application, is initiated and then, in a final step S6, the initialization of the propagation test is carried out by actuating the drive mechanism 6 of the propagation test cell 3.

Exemplary embodiments of test cell are further explained with reference to FIGS. 3A-6B.

Figure 3A:
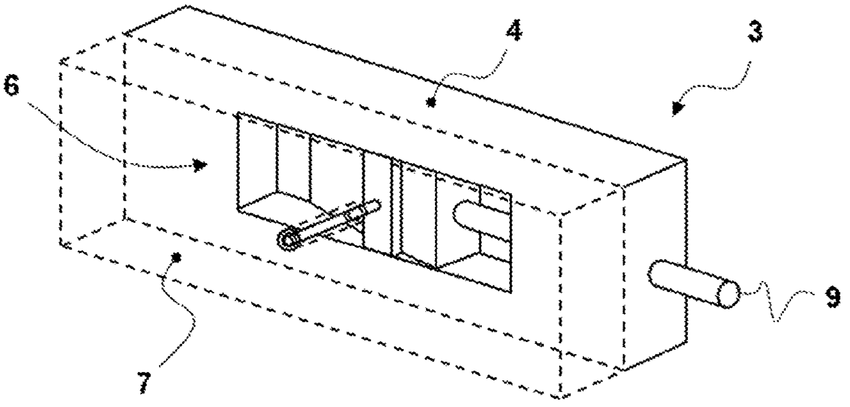
FIG. 3A shows a mechanically activatable propagation test cell.
Figure 3B:
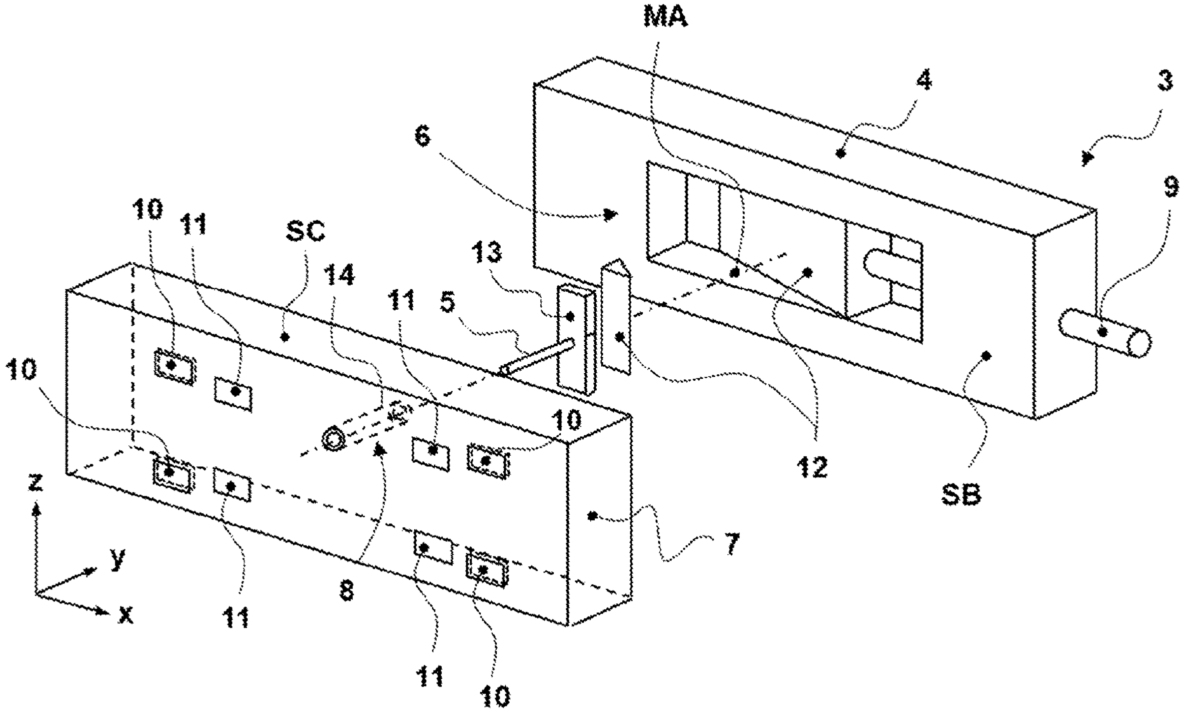
FIG. 3B shows an exploded view of the mechanically activatable propagation test cell.
Figure 4A:
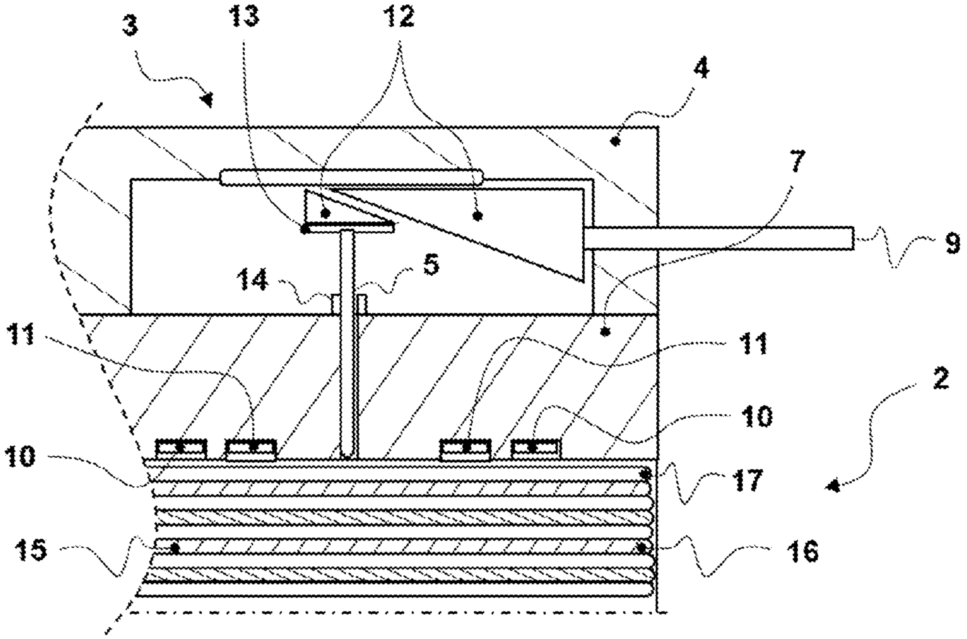
FIG. 4A shows the sectional view of the mechanically activatable propagation test cell.
Figure 4B:
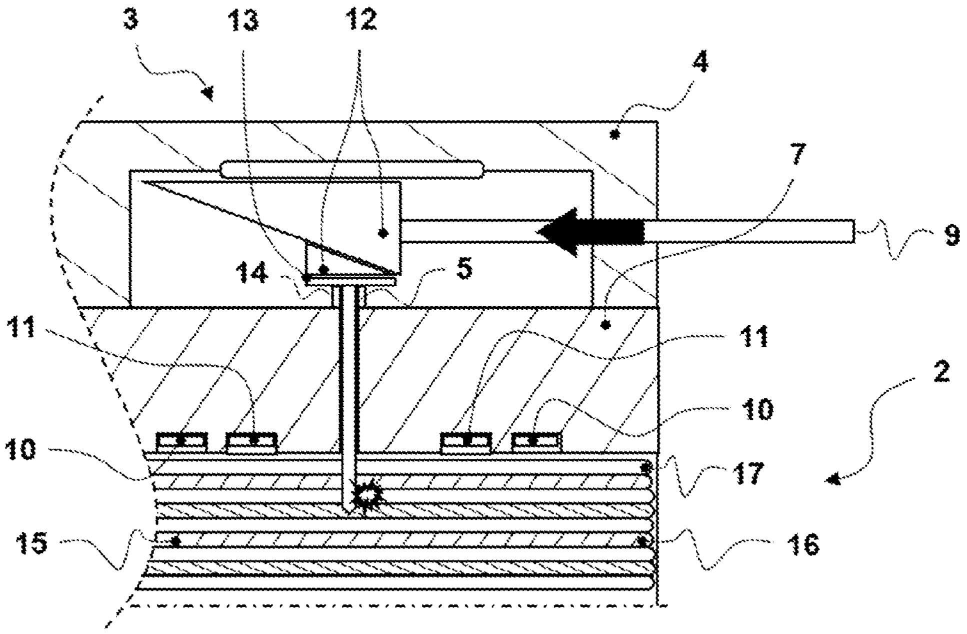
FIG. 4B shows the sectional view of the mechanically activated propagation test cell.

In FIG. 3A and FIG. 3B, an exemplary embodiment of a propagation test cell 3 with a mechanically activatable drive mechanism 12 is illustrated. The first housing part 4 comprises a substantially cuboid shape, wherein the second housing part 7 comprises the same extent in terms of surface of its reference surface SC as the reference surface SB of the first housing part 4. The external dimensions of the entire propagation test cell 3 are similar to those of a single one of further battery cells 2 of a cell module 1, in which the propagation test cell 3 is accordingly substitutable exactly in place of a single battery cell 2, as indicated in FIG. 1A. The drive mechanism 6 comprises a cuboid recess inside the first housing part 4 with an opening to the surface of the reference surface SB, along with a cylindrical mechanical connection to an end face through which a test interface 9 is formed. The mechanical drive mechanism 12 is merely indicated here as an example and schematically, wherein the mechanics shown neither claim to be complete nor are intended to limit the embodiment. For example, the mechanical drive mechanism 12 is implemented by the inclined plane principle, wherein a first slider is supported inside the recess of the drive mechanism 6 so as to be movable in the x-direction, and comprises a mechanical connection to a type of coupling rod of the test interface 9. The test interface 9 corresponds to a mechanical guide called a coupling rod, which can be moved in this manner from outside the propagation test cell 3 and the cell module 1. As a counterpart to the said first slider, a further slider is mutually arranged, which is mechanically coupled to a nail guide adapter 13, on which the nail 5 is arranged. In one embodiment, the nail guide adapter 13 comprises an electrically insulating material, such that the nail 5 is electrically insulated from the other components of the mechanical drive mechanism 12 and the propagation test cell 3. The exact configuration of the mechanical drive mechanism 12, the number, type and mounting of its components along with the type and design of all mechanical connections are shown in a purely schematic representation of the described mechanics.

For receiving and guiding the nail 5 in its movement along the movement axis MA, the second housing part 7 comprises a corresponding through bore 8 along with additionally a nail guide fit 14, which is arranged here in an exemplary manner as a hollow cylinder arranged on the reference surface SB of the second housing part 7 with its longitudinal axis aligned with the through bore and with the movement axis MA. In an advantageous embodiment, the inner diameter of the through hole of the nail guide fit 14 comprises a clearance fit that corresponds to the diameter of the shank of the nail 5, so that the latter is guided in its movement along the movement axis MA by the nail guide fit 14. In one embodiment, the second housing part 7 and/or the nail guide fit 14 can comprise an electrically insulating material, in order to complete the electrical insulation of the nail 5 from the other components of the propagation test cell 3. In addition, the second housing part 7 comprises a foil coating that extends in terms of surface at least over the surface of the second housing part 7 in contact with the adjacent battery cell 2 and has electrically insulating and sealing properties, so that, when the nail 5 penetrates into the said battery cell 2, the said battery cell 2 is also sealed against reaction gases that form.

The activation of the mechanical drive mechanism 12 along with the initialization of the propagation test is performed by mechanical actuation of the indicated coupling rod via the test cell interface 9, which in this case is merely designed as a mechanical guide of the said coupling rod, such that the first slider is pushed along the x-axis in the direction of the end face opposite the test cell interface 9. Corresponding to the movement of the first slider, the second slider, which is directed opposite to the first slider, is moved in the y-direction, in the direction of the second housing part 7, by which the nail 5, which is mechanically coupled to the second slider via the nail guide adapter 13, is moved along the movement axis MA.

In one embodiment, wherein the drive mechanism 6 of a propagation test cell 3 can be activated mechanically and the test cell interface 9 is designed merely as a mechanical guide for components of the mechanical drive mechanism 12, electrical connections to temperature measuring points 10 and pressure measuring points 11, which are arranged inside the second housing part 7, can be guided to the outside, for example, on the end face of the first housing part 4 and/or of the second housing part 7 opposite the test interface 9. According to the sectional view of a propagation test cell 3 with a mechanical drive mechanism 12 and an adjacent battery cell 2, in accordance with FIG. 4A and FIG. 4B, the described activation of the drive mechanism 6 takes place by moving the coupling rod of the test cell interface 9 in the direction of the arrow, wherein the nail 5 is guided through the gas-sealed nail guide fit 14 of the second housing part 7 due to the movement of the nail guide adapter 13 and partially penetrates the adjacent battery cell 2. When the nail 5 partially penetrates the adjacent battery cell 2, it completely penetrates at least one layer each of the anode 15, the cathode 16 and the separator 17 due to its longitudinal extent, by which a short circuit is triggered between the anode 15 and the cathode 16 of the battery cell 2 and the thermal runaway is initialized.

Figure 5A:
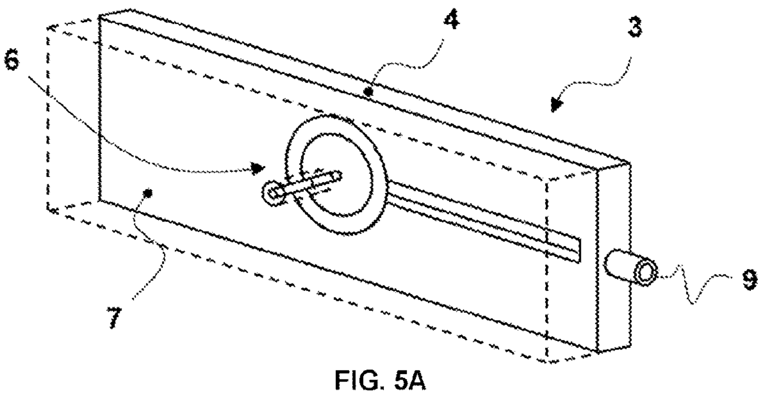
FIG. 5A shows a pneumatically activated propagation test cell.
Figure 5B:
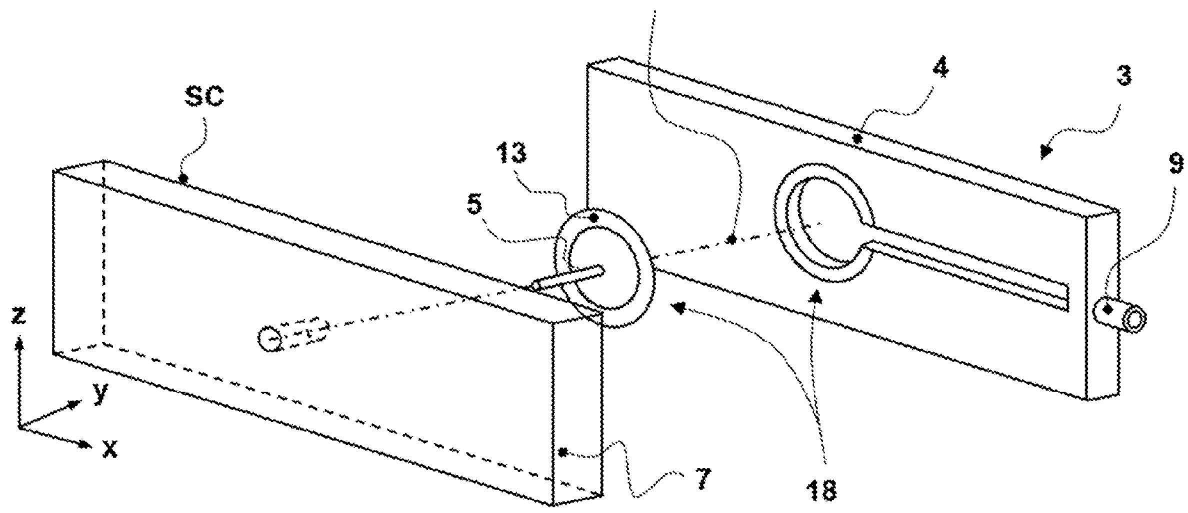
FIG. 5B shows the exploded view of a pneumatically activated propagation test cell.

In FIG. 5A and FIG. 5B, an exemplary embodiment of a propagation test cell 3 with a pneumatically activatable drive mechanism 18 is illustrated. The first housing part 4 comprises a substantially cuboid shape, wherein the second housing part 7 comprises the same extent in terms of surface of its reference surface SC as the reference surface SB of the first housing part 4. The external dimensions of the entire propagation test cell 3 are similar to those of a single one of further battery cells 2 of a cell module 1, in which the propagation test cell 3 is accordingly substitutable exactly in place of a single battery cell 2, as indicated in FIG. 1A. The drive mechanism 6 comprises a recess inside the first housing part 4 having an opening to the surface of the reference surface SB, and a connection to an end surface to which a test interface 9 connects. The pneumatic drive mechanism 18 is merely indicated here as an example and schematically, wherein the mechanics shown neither claim to be complete nor are intended to limit the embodiment. For example, the pneumatic drive mechanism 18 is implemented by the principle of a pneumatic spring by means of a pressure diaphragm, wherein the recess of the drive mechanism 6 is sealed via the nail guide adapter 13 in the form of a pressure diaphragm and the recess for connection to the test cell interface 9 is sealed via the second housing part 7. For this purpose, further sealing elements may be arranged inside the pneumatic drive mechanism 18 and on the second housing part 7. In one embodiment, the nail guide adapter 13 comprises an electrically insulating material, such that the nail 5 is electrically insulated from the other components of the pneumatic drive mechanism 18 and the propagation test cell 3. The exact design of the pneumatic drive mechanism 18, the number, type and bearing of its structural and sealing elements along with the type and design of all supply devices with respect to the pneumatic fluid are shown in a purely schematic representation of the described mechanics.

Figure 6A:
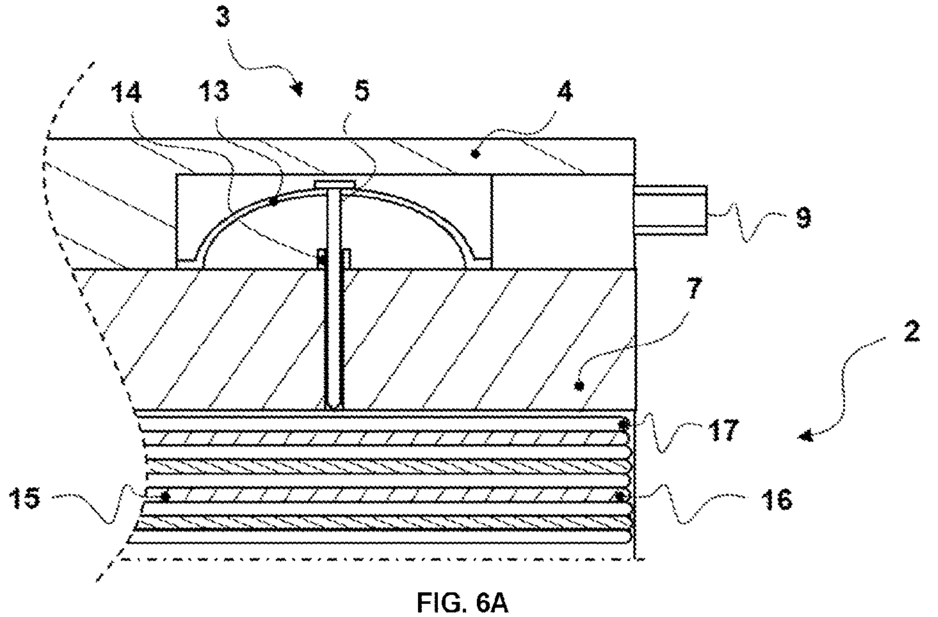
FIG. 6A shows the sectional view of the pneumatically activated propagation test cell.

In accordance with FIG. 6A, the second housing part 7 comprises, for receiving and guiding the nail 5 in its movement along the movement axis MA, a corresponding through bore 8 and, in addition, a nail guide fit 14, which is arranged here in an exemplary manner as a hollow cylinder arranged on the reference surface SB of the second housing part 7 with its longitudinal axis aligned with the through bore and with the movement axis MA. In an advantageous embodiment, the inner diameter of the through hole of the nail guide fit 14 comprises a clearance fit that corresponds to the diameter of the shank of the nail 5, so that the latter is guided in its movement along the movement axis MA by the gas-sealed nail guide fit 14. In one embodiment, the second housing part 7 and/or the nail guide fit 14 can comprise an electrically insulating along with pneumatically sealing material to complete the electrical insulation of the nail 5 from the other components of the propagation test cell 3 along with the sealing of the entire pneumatic drive mechanism 18 from the further test assembly.

Figure 6B:
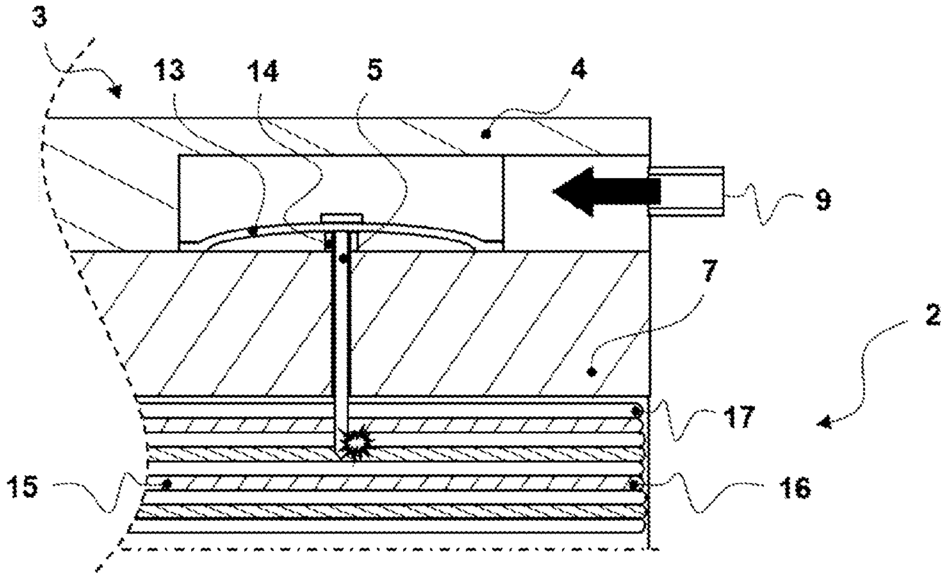
FIG. 6B shows the sectional view of the pneumatically activated propagation test cell.

In accordance with FIG. 6B, the pneumatic drive mechanism 18 is activated and the propagation test is initialized by means of pneumatic actuation via the indicated test cell interface 9, which in this case is merely a pneumatic pipeline, such that the pneumatic fluid is admitted into the cavity of the recess of the mechanical drive mechanism 12 in the direction of the arrow. In a manner corresponding to the pressure build-up within the said cavity on the inner side of the nail guide adapter 13 designed as a pressure diaphragm, the corresponding pressure diaphragm is extended in the direction of the second housing part 7, by which the nail 5, which is mechanically coupled to the nail guide adapter 13, moves along the movement axis MA. When the nail 5 partially penetrates the adjacent battery cell 2, it completely penetrates at least one layer each of the anode 15, the cathode 16 and the separator 17 due to its longitudinal extent, by which a short circuit is triggered between the anode 15 and the cathode 16 of the battery cell 2 and the thermal runaway is initiated. In one embodiment, wherein the drive mechanism 6 of a propagation test cell 3 can be activated pneumatically and the test cell interface 9 is designed merely as a pneumatic pipeline of the pneumatic drive mechanism 18, electrical connections to temperature measuring points 10 and pressure measuring points 11, which are arranged inside the second housing part 7, can be guided to the outside, for example, on the end face of the first housing part 4 and/or the second housing part 7 opposite the test interface 9.

The different types of actuation of the drive mechanism 6 of the propagation test cell 3, which can be designed, for example, as hydraulically or pneumatically, mechanically, electrically or magnetically or can be activated in other manners, are subject to application-related advantages and disadvantages. A mechanical drive mechanism 12, which can be realized, for example, by means of the inclined plane principle, a mechanical spring, a gear or lever transmission, or in other manners, is characterized by simple structure along with electrical insulation by means of selection of suitable materials, but requires further peripherals to ensure mechanical actuation from the outside. Hydraulic and pneumatic actuation types, on the other hand, also have a simple structure, but require additional components and considerations for sealing the entire hydraulic or pneumatic drive mechanism 18 from the rest of the test setup, and with respect to electrical insulation. Leaking fluids, for example, could affect the measurement results through the temperature measuring points 10 and pressure measuring points 11. Electrical and electromagnetic types of actuation, on the other hand, may ensure effective actuation of the entire drive mechanism 6, wherein, however, the introduction of further electrical peripherals could also have an impact on the overall propagation test.

However, taking into account the corresponding application case, the propagation test cell 3 can be modularized in an advantageous manner. For example, the various types of actuation may be prefabricated as independent modules as a function of different lengths of the nail 5, which can be integrated into the two housing parts (4, 7), which can also be prefabricated in various standardized geometric dimensions, through correspondingly provided recesses in them. Alternatively, however, the first housing part 4 and the second housing part 7 may also be manufactured on site, at the respective test setup, by means of the said extruding manufacturing processes. In this manner, the propagation test cell 3 can be adapted according to the requirements of the respective sequence of the propagation test, the geometric dimensions of the applied cell module 1 along with the corresponding battery cells 2, the required test parameters, such as the geometric design of the nail 5, necessary electrical insulation, the required penetration speed of the nail 5 or also the number, type and position of temperature measuring points 10 and pressure measuring points 11. For example, pressure measuring points 11 in the configuration of strain gauges may also be arranged subsequently on the surfaces of the first housing part 4, the second housing part 7 and the entire propagation test cell 3. In an alternative embodiment, the pressure measuring points 11 comprise strain gauges and/or piezoelectric measuring points. In a further alternative embodiment, temperature measuring points 10 comprise simple thermocouples.

LIST OF REFERENCE SIGNS

1 Cell module
2 Battery cell
3 Propagation test cell
4 First housing part
5 Nail
6 Drive mechanism
7 Second housing part
8 Through hole
9 Test cell interface
10 Temperature measuring point
11 Pressure measuring point
12 Mechanical drive mechanism
13 Nail guide adapter
14 Nail guide fit
15 Anode
16 Cathode
17 Separator
18 Pneumatic drive mechanism
$B_{xyz}$ Corner points of first housing part
$C_{xyz}$ Corner points of second housing part
MA Axis of movement of nail
SB Reference surface of first housing part
SC Reference surface of second housing part

The invention claimed is:

1. A propagation test cell (3), arranged within a cell module (1) that comprises a plurality of battery cells (2) in place of one or more of the plurality of battery cells (2),
- wherein the propagation test cell (3) comprises a mechanism for introducing a nail (5) into an adjacent one of the plurality of battery cells (2), whereby the propagation test cell (3) can initialize a propagation test from inside the cell module (1),
- wherein the mechanism for introducing the nail (5) is a drive mechanism (6) which is arranged completely or partially within the propagation test cell (3) and configured to push the nail (5) into the adjacent one of the plurality of battery cells (2), and
- wherein actuation of the drive mechanism (6) takes place mechanically, hydraulically, pneumatically, electrically or magnetically.

2. The propagation test cell (3) as in claim 1, further comprising
- a first housing part (4) having a substantially cuboid outer shape and comprising a drive mechanism (6) arranged completely or partly therein to move the nail (5) along a movement axis (MA),
- the nail (5), being mechanically coupled to the drive mechanism (6) and arranged such that its central axis of longitudinal extent extends coaxial with the movement axis (MA), and
- a second housing part (7),
  - having a reference surface (SC) arranged parallel and directed opposite to a reference surface (SB) of the first housing part (4) and being in contact therewith,
  - the second housing part (7) comprising a passage completely or partly open or closed and coaxial with the movement axis (MA) of the nail (5),
  - the passage having a passage cross-sectional area greater than a diameter of a shank of the nail (5).

3. The propagation test cell (3) as in claim 2,
- wherein the first housing part (4) and/or the second housing part (7) comprises a temperature measuring point (10) and/or a pressure measuring point (11),
- wherein the temperature measuring point (10) and/or the pressure measuring points (11) is integrated in or arranged on at least one surface of the first housing part (4) and the second housing part (7).

4. The propagation test cell (3) as in claim 2,
- wherein the passage of the second housing part (7) comprises a through bore (8) with a fit, and
- wherein the second housing part (7) comprises a guide element (14), and
- wherein the through bore (8) and the guide element (14) are designed to guide the nail (5) in its movement along the movement axis (MA) and/or to seal the propagation test cell (3) against reaction gases with respect to the adjacent one of the plurality of battery cells (2).

5. The propagation test cell (3) as in claim 2,
- wherein the first housing part (4) and the second housing part (7) comprise
  - materials that are designed to imitate the propagation test cell (3) in physical properties of thermal conductivity, thermal capacity, electrical conductivity and modulus of elasticity of those of the further battery cells (2) of the cell module (1) in which the propagation test cell (3) is used, and
  - further materials that are designed to insulate the propagation test cell (3) electrically with respect to the further battery cells (2) by a foil coating on at least one outer surface of the first housing part (4) and the second housing part (7) and/or a ceramic sheath of the nail (5).

6. A method for performing a propagation test on a battery module (1) having at least two battery cells (2), comprising:
- substituting at least one of the at least two battery cells (2) with the propagation test cell (3) according to claim 3;
- physically and electrically integrating the propagation test cell (3) within the cell module (1);
- connecting the drive mechanism (6) and networking the temperature measuring point (10) and the pressure measuring point (11) with a further test assembly;
- preparing the cell module (1) by electrically charging the battery module (1) and/or checking its functionality within the test assembly;
- initiating a recording with measurement technology of measurement parameters including voltage, temperature and/or pressure curves; and
- initializing of the propagation test from inside the cell module (1) by actuating the drive mechanism (6) of the propagation test cell (3), wherein the drive mechanism (6) drives the nail (5) into the adjacent on of the plurality of cells (2), so that at least one each of an anode and a cathode are penetrated, causing an internal electrical short circuit in the adjacent one of the battery cells (2).

* * * * *